United States Patent
Sakuragi

(10) Patent No.: US 9,007,609 B2
(45) Date of Patent: Apr. 14, 2015

(54) COPY MACHINE HAVING A PRECEDING PRINT MODE AND A MEMORY PRINT MODE

(71) Applicant: Yuichiro Sakuragi, Nagoya (JP)

(72) Inventor: Yuichiro Sakuragi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/951,970

(22) Filed: Jul. 26, 2013

(65) Prior Publication Data

US 2014/0036288 A1 Feb. 6, 2014

(30) Foreign Application Priority Data

Aug. 2, 2012 (JP) ................... 2012-171765

(51) Int. Cl.
| | |
|---|---|
| *G06F 3/12* | (2006.01) |
| *H04N 1/00* | (2006.01) |
| *H04N 1/23* | (2006.01) |
| *H04N 1/32* | (2006.01) |
| *H04N 1/333* | (2006.01) |

(52) U.S. Cl.
CPC ......... *H04N 1/00278* (2013.01); *H04N 1/2369* (2013.01); *H04N 1/32443* (2013.01); *H04N 1/33315* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,107,339 A * | 4/1992 | Bertoni et al. ................ 358/296 |
| 2003/0020967 A1 | 1/2003 | Okamoto et al. | |
| 2007/0036596 A1* | 2/2007 | Takahashi ..................... 399/381 |
| 2010/0245877 A1* | 9/2010 | Wei et al. ..................... 358/1.13 |
| 2012/0320398 A1* | 12/2012 | Katsuda et al. .............. 358/1.13 |
| 2014/0036289 A1* | 2/2014 | Muroi .......................... 358/1.13 |

FOREIGN PATENT DOCUMENTS

| | | |
|---|---|---|
| JP | H02-18574 A | 1/1990 |
| JP | 8-307622 A | 11/1996 |
| JP | 2001-053920 A | 2/2001 |
| JP | 2003-036013 A | 2/2003 |
| JP | 2010-034774 A | 2/2010 |

* cited by examiner

*Primary Examiner* — Miya J Cato

(74) *Attorney, Agent, or Firm* — Scully, Scott, Murphy & Presser, PC

(57) ABSTRACT

A copy machine includes a reading unit, a printing unit, a processor and memory. In a case where a specific condition, which includes at least a condition that a read mode of the reading unit is performed in a discontinuous read mode, is satisfied, the copy machine controls the printing unit to perform printing in a preceding print mode, including starting printing of the image of the document before the reading of the document by the reading unit is completed. In a case where the specific condition is not satisfied, the copy machine controls the printing unit to perform printing in a memory print mode, including starting printing of the image of the document after the reading of the document by the reading unit is completed.

15 Claims, 6 Drawing Sheets

COPY MACHINE HAVING A PRECEDING PRINT MODE AND A MEMORY PRINT MODE

CROSS-REFERENCE TO RELATED APPLICATION

This application claims priority from Japanese Patent Application No. 2012-171765 filed on Aug. 2, 2012, the entire subject matter of which is incorporated herein by reference.

TECHNICAL FIELD

Illustrative aspects of the present invention relate to a copy machine configured to read a document and print a read image, and more specifically, to a copy machine having a copy method that starts printing without waiting for completion of reading of a part of a document to be copied onto one recording sheet, and a copy method that starts printing after completion of reading of a document.

BACKGROUND

As a technology relative to copy machines, there has been proposed a copy method that starts printing without completion of reading of a document in order to reduce a time from start of the reading to completion of the printing. In this specification, this print mode to start printing without waiting for completion of reading of a document is referred to as a "preceding print mode". Meanwhile, the print mode to start printing after completion of reading of a document is referred to as a "memory print mode".

For example, there has been disclosed a technology of selecting a compression scheme according to the type of a copy command, compressing data of a read document according to the selected compression scheme, and determining a print start timing according to the compression scheme in a copy machine for performing a preceding print mode.

SUMMARY

Illustrative aspects of the present invention provide a copy machine capable of securing an opportunity to perform a preceding print mode while suppressing the influence of defects according to the preceding print mode.

According to one illustrative aspect of the present invention, there is provided a copy machine comprising: a reading unit configured to read a document; a printing unit configured to print an image of the document read by the reading unit onto recording paper; a processor; and memory storing computer readable instruction that, when executed by the processor, cause the copy machine to: in a case where a specific condition, which includes at least a condition that a read mode of the reading unit is performed in a discontinuous read mode, is satisfied, control the printing unit to perform printing in a preceding print mode, comprising starting printing of the image of the document before the reading of the document by the reading unit is completed; and in a case where the specific condition is not satisfied, control the printing unit to perform printing in a memory print mode, comprising starting printing of the image of the document after the reading of the document by the reading unit is completed.

DETAILED DESCRIPTION

<General Overview>

Figure 1:
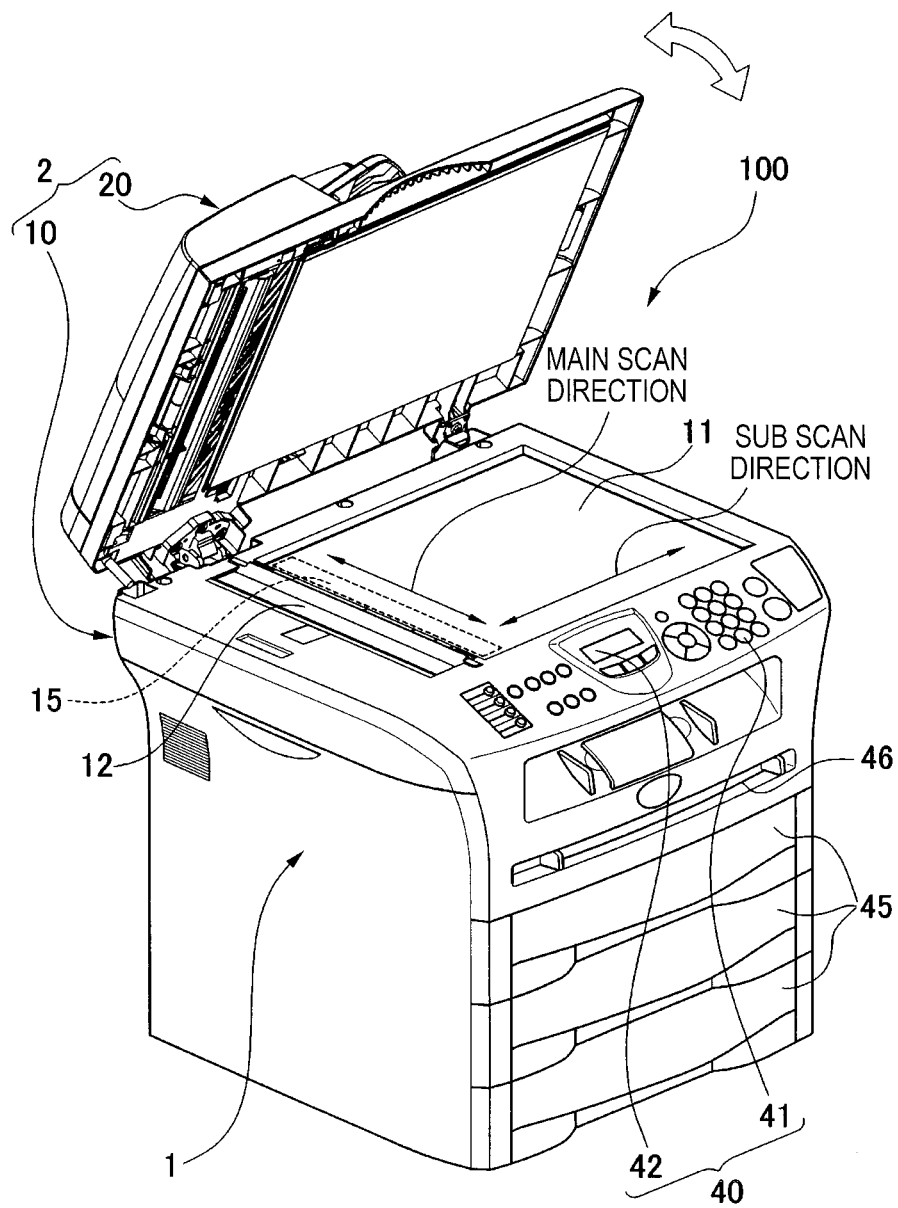
FIG. 1 is a perspective view illustrating an outer appearance of an MFP according to an exemplary embodiment.

The above-described related-art technology has some disadvantages. That is, in the preceding print mode, since print starts before reading is completed, in a case where any error such as an error in reading a document occurs after print starts, a risk of occurrence of defects such as data deficiency may be high. Specifically, in electrophotographic apparatuses, since it is difficult to temporarily stop a print process, if a defect occurs in reading in the middle of copy in the preceding print mode, there is a risk that sheets, toner, and the like would be wasted in the middle of print, and effort of performing the copy process over again would be needed. Meanwhile, in the memory print mode, it is difficult to early obtain a printed matter, as compared to the preceding print mode.

Therefore, illustrative aspects of the present invention provide a copy machine capable of securing an opportunity to perform a preceding print mode while suppressing the influence of defects according to the preceding print mode.

According to a first illustrative aspect of the present invention, there is provided a copy machine comprising: a reading unit configured to read a document; a printing unit configured to print an image of the document read by the reading unit onto recording paper; a processor; and memory storing computer readable instruction that, when executed by the processor, cause the copy machine to: in a case where a specific condition, which includes at least a condition that a read mode of the reading unit is performed in a discontinuous read mode, is satisfied, control the printing unit to perform printing in a preceding print mode, comprising starting printing of the image of the document before the reading of the document by the reading unit is completed; and in a case where the specific condition is not satisfied, control the printing unit to perform printing in a memory print mode, comprising starting printing of the image of the document after the reading of the document by the reading unit is completed.

The copy machine disclosed in this specification determines whether the specific condition including the condition that the read mode is performed in the discontinuous read mode is satisfied, during a copy process. Then, in a case where the specific condition is satisfied, print in the preceding print mode is performed. In the preceding print mode, for example, if defects such as a read error occurring after start of print occur, expendables such as sheets, toner, and the like are likely to be wasted in the middle of the print. Specifically, if reading is continuously performed, it is likely to be influenced by the defects. Meanwhile, in a case where the read mode is the discontinuous read mode, as compared to a case where the read mode is other than the discontinuous read mode, even if defects occur in the preceding print mode, a loss of expendables is few. Further, the effort of performing the copy process over again is little. That is, if the preceding print mode is selected only in a case where the specific condition including the condition that the read mode is performed in the discontinuous read mode is satisfied, even if the defect occurs, the defect may hardly become a serious problem. Therefore, it is preferable to secure an opportunity to perform the preceding print mode and receive the benefit of the advantage of the preceding print mode.

Incidentally, the discontinuous read mode corresponds to a read mode in a case where a document of a job is only one sheet, and is read, for example, in a flatbed scheme, or in a case where a document of only one sheet is placed and is read in a document feeding scheme. Meanwhile, a read mode which is not the discontinuous read mode corresponds to a read mode in a case where a document of a plurality of sheets is placed together on an automatic document feeding unit. Further, the specific condition needs only to include the condition that the read mode is performed in the discontinuous read mode, and may be combined with other conditions.

According to a second illustrative aspect of the present invention, in a case where a read range of the document has been uniquely determined before the reading of the reading unit starts, even if the specific condition is not satisfied, the processor is configured to control the printing unit to perform printing in the preceding print mode.

Even when the read mode is not the discontinuous read mode, in a case where the read range is uniquely determined, even if the preceding print mode is performed, a risk of occurrence of defects is low. For this reason, in the case where the read range is uniquely determined, it is preferable to preferentially perform the preceding print mode.

According to a third illustrative aspect of the present invention, in a case where a read range of the document has been uniquely determined before the reading of the reading unit starts, the processor is configured to control the printing unit to perform printing in the preceding print mode without determining whether the reading mode of the reading unit is performed in the discontinuous read mode.

According to a fourth illustrative aspect of the present invention, in a case where the memory print mode has been designated by setting, even if the specific condition is satisfied, the processor is configured to control the printing unit to perform printing in the memory print mode.

In the case where setting of the user has been performed, it is user-friendly to preferentially accord to that setting. Therefore, regardless of whether the read mode is the discontinuous read mode, in a case where the memory print mode is designated by setting of the user, it is preferable to perform the printing according to the setting of the user.

According to a fifth illustrative aspect of the present invention, in a case where any sheet feeding unit has not been designated when the processor controls the printing unit to perform printing in the preceding print mode, the processor is configured to select and use a sheet feeding unit with a high frequency of use.

It is highly likely that the size of recording paper stored in the sheet feeding unit with the high frequency of use is matched with the size of the document. Therefore, by selecting the sheet feeding unit with the high frequency of use, it is possible to reduce a risk of a mismatch between the size of the document and the size of the recording paper.

According to a sixth illustrative aspect of the present invention, the specific condition further includes a condition that a designated number of copies to be printed is one.

In a case of printing a plurality of copies, by storing the image data of the entire document and repeatedly perform only the printing, the process is completed within a shorter time as compared to a case of repeating reading. Here, the preceding print mode is unsuitable for storing the image data of the entire document, because it is difficult for the preceding print mode to perform compression with a high compression ratio. That is, in the case of printing a plurality of copies, it is preferable to compress the image data of the entire document with a high compression ratio and store the compressed data. Therefore, it is preferable to perform the preceding print mode in a case of printing a single copy, and not to perform the preceding print mode in the case of printing a plurality of copies.

According to a seventh illustrative aspect of the present invention, in a case where a read range of the document has been uniquely determined before the reading of the reading unit starts, the processor is configured to control the printing unit to perform printing in the preceding print mode without determining whether the reading mode of the reading unit is performed in the discontinuous read mode.

According to an eighth illustrative aspect of the present invention, the processor is further configured to determine whether a number of sheets of the document to be read is one. In a case where the processor determines that the number of sheets of the document is one, the processor is configured to set the read mode of the reading unit to the discontinuous read mode.

If the number of sheets of the document is 1, it is possible to determine that the read mode is the discontinuous read mode.

According to a ninth illustrative aspect of the invention, in a case where the processor determines that the number of sheets of the document is not one, the processor is configured to control the printing unit to perform printing in the memory read mode.

According to a tenth illustrative aspect of the invention, the reading unit comprises a reading device that is movable and is configured to read the document. The reading unit has: a document-movement-based reading function of reading the document while moving the document; and a device-movement-based reading function of reading the document while moving the reading device. In a case where the reading unit uses the device-movement-based reading function to read the document, the processor is configured to set the read mode of the reading unit to the discontinuous read mode.

If the read mode is a read mode using the device-movement-based reading function, it is possible to determine that the read mode is the discontinuous read mode. Here, a read scheme using an automatic document feeding unit corresponds to a read scheme according to the document-movement-based reading function, and a flatbed scheme corresponds to a read scheme according to the device-movement-based reading function, for example.

According to an eleventh illustrative aspect of the present invention, in a case where the reading unit uses the document-movement-based reading function to read the document, the processor is configured to determine whether the number of sheets of the document to be read is one. In a case where the processor determines that the number of sheets of the document is one, the processor is configured to set the read mode of the reading unit to the discontinuous read mode and control the printing unit to perform printing in the preceding print mode. In a case where the processor determines that the number of sheets of the document is not one, the processor is configured to control the printing unit to perform printing in the memory print mode.

According to a twelfth illustrative aspect of the present invention, the copy machine further comprises: a document placing part configured to place the document thereon; and a one-sheet detector configured to detect that the placed document is one sheet. The processor is configured to: in a case where the one-sheet detector detects that the placed document is one sheet, determine that the specific condition is satisfied and control the printing unit to perform printing in the preceding print mode; and in a case where the one-sheet detector detects that the placed document is plurality sheets, determine that the specific condition is not satisfied and control the printing unit to perform printing in the memory print mode.

According to a thirteenth illustrative aspect of the present invention, there is provided a copy machine comprising: a reading unit configured to read a document; a printing unit configured to print an image of the document read by the reading unit onto recording paper; a processor; and memory storing computer readable instruction that, when executed by the processor, cause the copy machine to: in a case where a number of copies is one and a read range of the reading unit has been uniquely determined before the reading of the reading unit starts, control the printing unit to perform printing in a preceding print mode, comprising starting printing of the image of the document before the reading of the document by the reading unit is completed; in a case where the number of copies is one, and the read range of the reading unit has not been uniquely determined before the reading of the reading unit starts and the read mode of the reading unit is a discontinuous read mode, control the printing unit to perform printing in the preceding print mode; in a case where the number of copies is two or more, control the printing unit to perform printing in a memory print mode, comprising starting printing of the image of the document after the reading of the document by the reading unit is completed; and in a case where the number of copies is one, the read range of the reading unit has not been uniquely determined before the reading of the reading unit starts and the read mode of the reading unit is not the discontinuous read mode, control the printing unit to perform printing in the memory print mode.

According to the illustrative aspects of the present invention, it is possible to implement a copy machine capable of securing an opportunity to perform a preceding print mode while suppressing the influence of defects according to the preceding print mode.

<Exemplary Embodiments>

Exemplary embodiments of the present invention will be described in detail with reference to the accompanying drawings. The present exemplary embodiment is obtained by applying the present invention to a multi-function peripheral (MFP) having an image reading function and an image forming function.

[Configuration of MFP]

As shown in FIG. 1, an MFP 100 of the present exemplary embodiment includes an image forming unit 1 configured to print an image onto a sheet, and an image reading unit 2 configured to read an image of a document. The image forming unit 1 is an example of a printing unit. The image reading unit 2 is an example of a reading unit.

On the front surface side of the MFP 100, an operation panel 40 having a button group 41 and a display unit 42 are provided. The button group 41 is composed of various buttons such as a start key, a stop key, and a numeric keypad, and is configured to receive an input of a user. The display unit 42 is composed of, for example, a liquid crystal display, and is configured to display messages toward the user.

Further, at the lower portion of the image forming unit 1, a plurality of sheet trays 45 and a manual feed inlet 46 are provided. The sheet trays 45 are configured to store sheets for image formation. The image forming unit 1 is configured to determine one of the sheet trays 45 and the manual feed inlet 46 as a sheet feeding unit on a basis of, for example, an instruction of the user. Then, the image forming unit 1 is configured to feed the sheet one at a time from the determined sheet feeding unit, and form an image on the fed sheet. The sheet trays 45 and the manual feed inlet 46 selectable as a sheet feeding unit are examples of a sheet feeding unit.

The image forming unit 1 of the MFP 100 is a printer configured to form color images electro-photographically. Alternatively, the image forming unit 1 may be dedicated for monochrome images. The image forming unit 1 includes a photosensitive element and a process unit for forming a toner image on the photosensitive element. The image forming unit 1 is configured to transfer a toner image formed on the photosensitive element by the process unit, onto a sheet, and fix the toner image on the sheet, thereby obtaining an image.

Incidentally, the image forming unit 1 is a page printer for forming an image on a sheet one at a time. The image print of the image forming unit 1 is performed in units of one sheet of printing paper. Therefore, in the image forming unit 1, if a series of image forming operations starts, it is difficult to temporarily stop the series of image forming operations in the middle of it until an image forming process on one sheet is completed. Starting an image forming operation means to start a toner image forming operation while starting feed of a sheet to the process unit. Feed of a sheet to the process unit is specifically an operation of restarting rotation of a registration roller having been temporarily stopped.

[Configuration of Image Reading Unit]

As shown in FIG. 1, the image reading unit 2 is provided on the image forming unit 1 and includes a reading unit 10 and a document feeding unit 20. The reading unit 10 includes contact glass sheets 11 and 12 provided on its top, and an image sensor 15 provided below the contact glass sheets 11 and 12. The image sensor 15 includes optical devices arranged in a line in a main scan direction, and is provided to be movable in a sub scan direction.

The image reading unit 2 has a document-movement-based reading function and a device-movement-based reading function, as functions of reading images of documents. In a case of reading a document placed on the contact glass sheet 11, the image reading unit 2 reads an image of the document while moving the image sensor 15 in the sub scan direction. The function of reading a document while moving the image sensor 15 is the device-movement-based reading function. Hereinafter, a reading scheme using the device-movement-based reading function will be referred to as a flatbed (FB) scheme.

Meanwhile, in a case of reading a document placed on the document feeding unit 20, the image reading unit 2 moves the image sensor 15 to a position facing the contact glass sheet 12, and reads an image of the document while moving the document. The function of reading a document while moving the document, without moving the image sensor 15 during the reading of the document, is the document-movement-based reading function. Hereinafter, a reading scheme using the document-movement-based reading function will be referred to as an auto document feeder (ADF) scheme.

As shown in FIG. 1, the document feeding unit 20 is openable and closable. In an open state, the document feeding unit 20 is separated from the top surfaces of the contact glass sheets 11 and 12. In a closed state, the document feeding unit 20 covers the top surfaces of the contact glass sheets 11 and 12. Incidentally, FIG. 1 shows the open state of the document feeding unit 20. In a case of performing reading in the FB scheme, the user directly sets a document on the contact glass sheet 11. Then, the user closes the document feeding unit 20, thereby making the image reading unit 2 read the image of the document.

Figure 2:
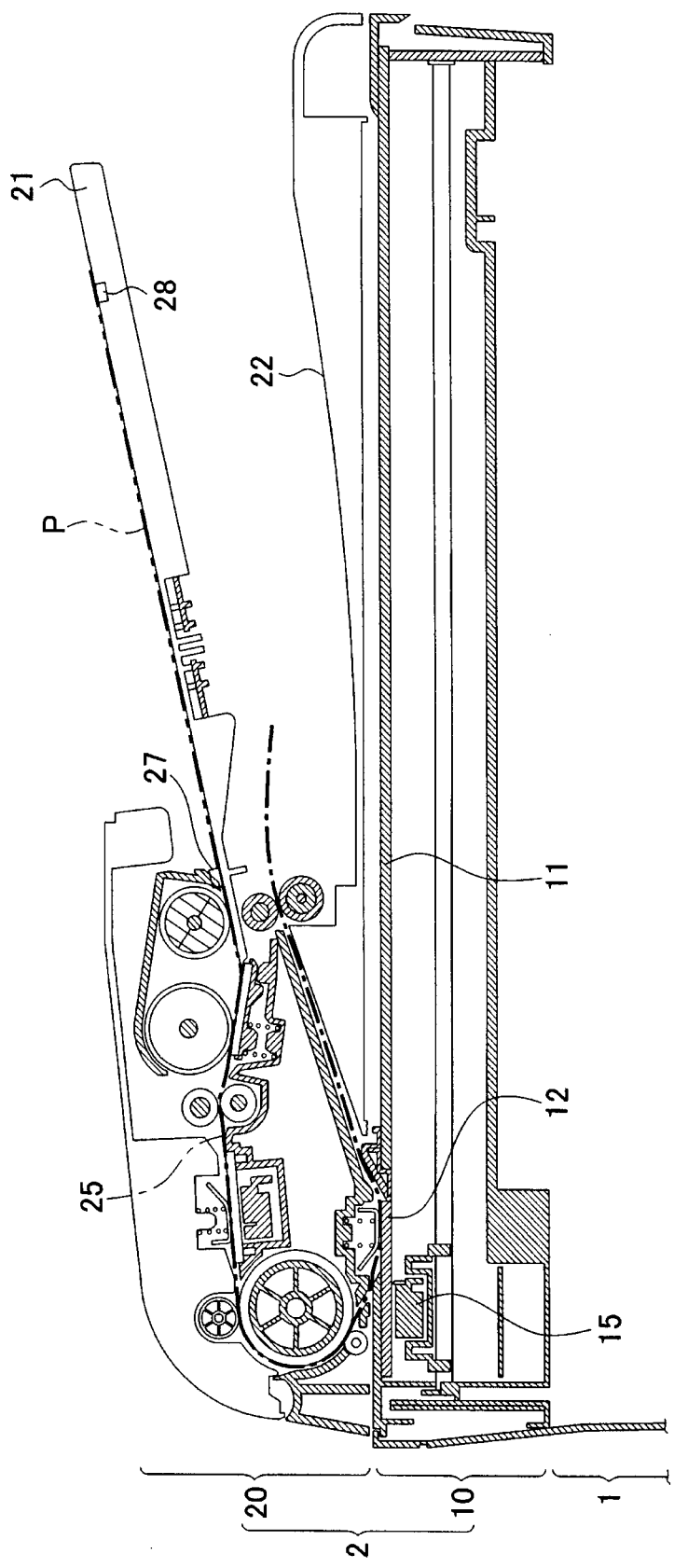
FIG. 2 is a cross-sectional view illustrating a document feeding unit.

The document feeding unit 20 includes a document placing tray 21 and a document discharge tray 22, as shown in FIG. 2.

The document feeding unit 20 further includes a document feed path 25 provided as a document path from the document placing tray 21 to the document discharge tray 22.

In a case of performing reading in the ADF scheme, the user inserts a document to be copied into the document placing tray 21 of the document feeding unit 20. The document placing tray 21 can receive a document of a plurality of sheets in a stacked sate. In a case of reading a document set on the document feeding unit 20, the image reading unit 2 stops the image sensor 15 at a position facing the contact glass sheet 12. Then, the document feeding unit 20 feeds the document one at a time, such that the document passes above the image sensor 15 in the middle of the document feed path 25. After the document is positioned to face the image sensor 15, the document is further conveyed, and is discharged onto the document discharge tray 22.

The document placing tray 21 of the document feeding unit 20 includes a document detecting unit 27 configured to detect whether a document of one or more sheets is placed thereon, and a one-sheet detecting unit 28 configured to detect that a placed document is one sheet. For example, the document detecting unit 27 is an optical sensor with a swingable piece provided at an entrance from the document placing tray 21 to the document feed path 25. When the optical sensor detects that the swingable piece has swung to an extent, the MFP 100 determines that a document is placed on the document placing tray 21.

Further, the one-sheet detecting unit 28 is, for example, a reflective optical sensor provided at the top of the document placing tray 21. The one-sheet detecting unit 28 is provided at a position to detect a trailing end portion of the document placed on the document placing tray 21. If a document of one or more sheets is placed on the document placing tray 21, the one-sheet detecting unit 28 detects the document.

In a case where the placed document is only one sheet, a leading end portion of the document is drawn into the document feed path 25. Therefore, the one-sheet detecting unit 28 does not detect the document. Meanwhile, in a case where the placed document is a plurality of sheets, even if the leading end portion of the first sheet of the document is drawn into the document feed path 25, the one-sheet detecting unit 28 detects the remaining sheets of the document. Therefore, in the MFP 100, on the basis of the detection results of the document detecting unit 27 and the one-sheet detecting unit 28, it is possible to determine whether any document is on the document feeding unit 20, and whether a placed document is one sheet. Incidentally, the MFP 100 is able to perform the above-described two determinations until the image reading unit 2 starts to read the image of the first sheet of the document.

Incidentally, the one-sheet detecting unit 28 may detect the weight or thickness of the document placed on the document placing tray 21, thereby detecting whether the placed document is one sheet. Alternatively, the one-sheet detecting unit 28 may also function as the document detecting unit 27.

[Electric Configuration of MFP]

Subsequently, the electric configuration of the MFP 100 will be described.

Figure 3:
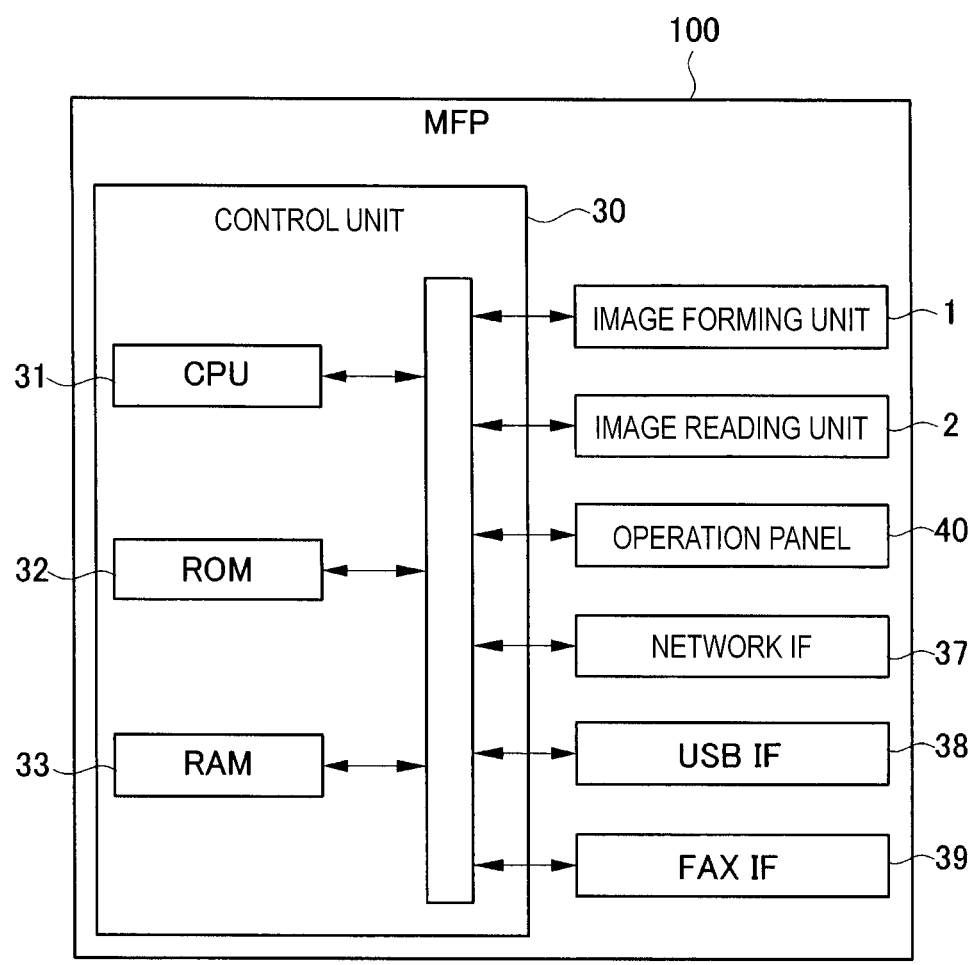
FIG. 3 is a block diagram illustrating an electric configuration of the MFP shown in FIG. 1.

As shown in FIG. 3, the MFP 100 includes a control unit 30 including a CPU 31, a ROM 32, and a RAM 33. The control unit 30 is electrically connected to the image forming unit 1, the image reading unit 2, the operation panel 40, a network interface 37, a USB interface 38, and a FAX interface 39.

The CPU 31 is configured to perform operations for implementing various functions such as an image reading function and an image forming function in the MFP 100, and becomes a core of the control. According to a control program read from the ROM 32, the CPU 31 controls individual components of the MFP 100 while storing the result of the process. The CPU 31 is an example of a control unit and a determining unit.

The ROM 32 stores various control programs for controlling the MFP 100, image processing programs, various option values, etc. The RAM 33 is used as a work space during execution of processes of various control programs and image processing programs. The RAM 33 is used as a storage area for temporarily storing image data of documents read by the image reading unit 2, and image data transmitted through various interfaces 37, 38, and 39.

The network interface 37 is connected to an information processing apparatus such as a computer. The USB interface 38 is connected to peripherals capable of USB connection, for example, USB memories. The FAX interface 39 is connected to a public telephone line. The MFP 100 is capable of data communication with external peripherals and the like through the network interface 37 or the USB interface 38. The MFP 100 is capable of transmission and reception of fax through the FAX interface 39.

[Copy Process]

Subsequently, a copy process of the MFP 100 will be described. The copy process is a process of the MFP 100 to make the image forming unit 1 form images using image data read by the image reading unit 2. Here, the copy process means a process of printing image data obtained by reading a document of one sheet onto one sheet, without processing the image data.

Reading of a document by the image reading unit 2 is performed in any one of the FB scheme and the ADF scheme. In any case, the image reading unit 2 performs reading in units of one line in the main scan direction while relatively moving a read portion in the sub scan direction of the document. The read range of the document with respect to the sub scan direction by the image reading unit 2 in the copy process is determined on the basis of a sheet size with respect to a sheet feed direction in the image forming unit 1.

[Modes of Copy Process]

Figure 4:
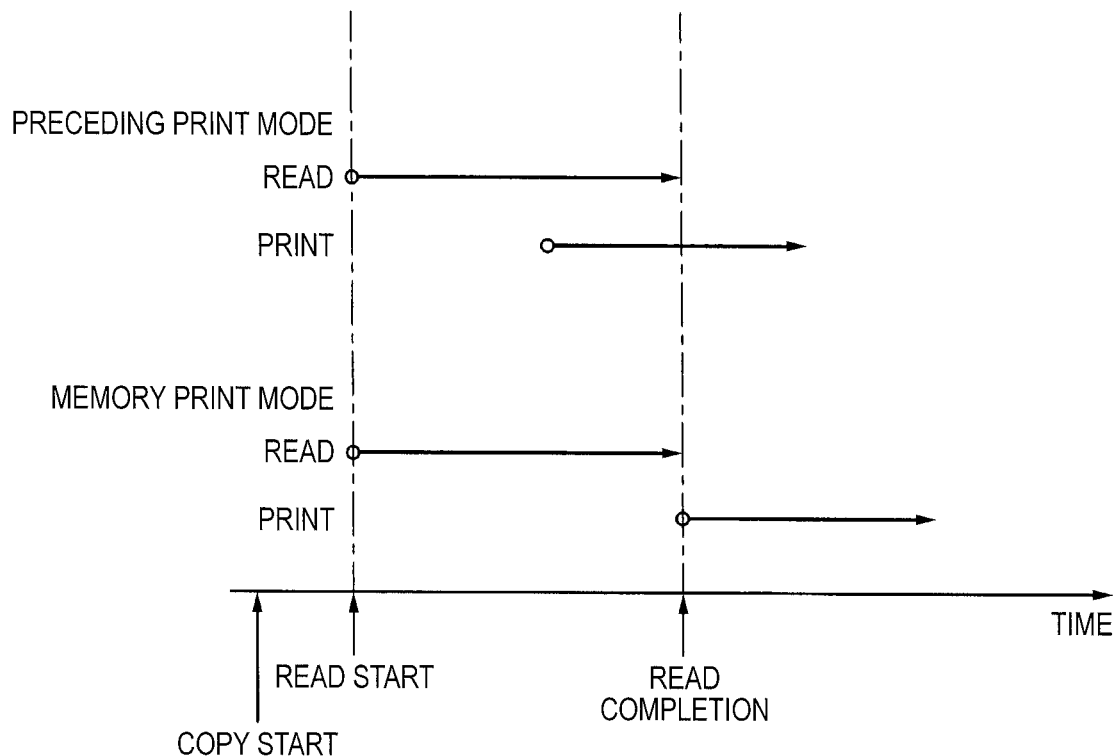
FIG. 4 is an explanatory view illustrating a timing difference between modes.

The MFP 100 has a preceding print mode and a memory print mode as modes for performing the copy process. The process timings in each mode are shown in FIG. 4. The preceding print mode is a mode to start image forming of the image forming unit 1 with respect to a document of one sheet, before the image reading unit 2 completes reading of the document. Meanwhile, the memory print mode is a mode to start image forming of the image forming unit 1 with respect to a document of one sheet after the image reading unit 2 completes reading of the document.

Incidentally, 'completion of reading of a document' means that the image reading unit 2 has read the above-described read range to the end. In the FB scheme, completion of reading of a document means that the image forming unit 1 has reached a position facing the end of the read range of the document. In the ADF scheme, completion of reading of a document means that the document has been conveyed to a position where the end of the read range of the document and the image sensor 15 face each other. Incidentally, in this specification, a process relative to image processing on image data obtained by the image reading unit 2 is not included in document reading.

Upon receiving a copy process instruction, the MFP 100 first controls the image reading unit 2 to start document reading. Then, the MFP 100 determines whether to execute the preceding print mode or the memory print mode until a print start timing in a case where the preceding print mode is selected. Next, the MFP 100 controls the image forming unit 1 to start printing at the print start timing in the selected mode. Incidentally, the MFP 100 determines a print operation start timing in the preceding print mode by back calculation from an estimated point of time when the image reading unit 2 completes the document reading.

As shown in FIG. 4, print in the preceding print mode starts before the image reading unit 2 completes the document reading, and is performed using image data of a read portion while the image reading unit 2 performs image reading. That is, in the preceding print mode, the image forming process of the image forming unit 1 starts before image data to be printed onto one sheet becomes complete.

Sheets for image forming of the image forming unit 1 need to be determined at least before start of the image forming operation. For this reason, in the preceding print mode, sheets for image forming are determined before document reading of the image reading unit 2 is completed. Further, as shown in FIG. 4, the completion of the preceding print mode is as early as the start thereof, as compared to the memory print mode. That is, the preceding print mode completes a printed matter within a shorter time from a copy start instruction, as compared to the memory print mode.

As described above, when the image forming process of the image forming unit 1 starts once, it is difficult to temporarily stop the image forming process in the middle of the process corresponding to one sheet. For this reason, in the preceding print mode, after a print operation starts, if an event in which a series of image reading processes of the image reading unit 2 is not ready in time for the progress of the image forming operation of the image forming unit 1 occurs, there is a possibility of a copy error such as data omission.

Meanwhile, in the memory print mode, if the image reading unit 2 completes reading of a document of one sheet such that image data for image forming onto one sheet becomes complete, print starts. Therefore, in the memory print mode, even if there is a defect in the reading, it is possible to suppress waste of expendables such as sheets and toner from increasing. Meanwhile, it takes a long time to be able to obtain a printed matter, as compared to the preceding print mode.

Incidentally, in the preceding print mode, the MFP 100 stores the read image data in the RAM 33 without compression. However, due to the limitation of the capacity of the RAM 33, there is a possibility that the MFP 100 is unable to store all image data of a document in the RAM 33. For this reason, the MFP 100 deletes image data sequentially from a portion having been read for an image forming process, and overwrites newly read image data.

In the memory print mode, image data read by the image reading unit 2 is compressed and stored in the RAM 33. Since the image data is compressed, the RAM 33 is able to store image data of at least one or more sheets of the document. For this reason, for example, in a case where various image processing is needed, or in a case where it is instructed to make two or more copies, the MFP 100 selects the memory print mode. In the memory print mode, the image forming unit 1 restores image data read from the RAM 33, and uses the restored image data.

[Mode Selection Copy Process]

Subsequently, a mode selection copy process in which the CPU 31 selects any one of the preceding print mode and the memory print mode and controls to perform copy will be described with reference to FIG. 5. Upon the user pushes a copy start button, the mode selection copy process is performed by the CPU 31.

When performance of the mode selection copy process starts, first, in STEP S101, the CPU 31 controls the image reading unit 2 to start to read the first sheet of the document. Since the document detecting unit 27 and the one-sheet detecting unit 28 are provided in the document placing tray 21, the CPU 31 is able to determine existence or non-existence of a document on the document placing tray 21 before document reading starts. If a document is placed on the document placing tray 21, the CPU 31 starts reading of the ADF scheme. If the document is not placed on the document placing tray 21, the CPU 31 starts reading of the FB scheme.

Next, in STEP S102, the CPU 31 acquires information on the number of copies designated by the user, and determines whether the number of copies is one. In a case where the number of copies is two or more (No in STEP S102), in STEP S103, the CPU 31 selects the memory print mode. The reason is that the memory print mode to compress image data and store the compressed data in the RAM 33 is suitable for printing two or more copies.

That is, in a case where two or more copies are designated to, the CPU 31 selects the memory print mode in STEP S103, and starts a copy operation. That is, after the reading of the image of one sheet of the document is completed, in STEP S105, the CPU 31 starts a print operation. When printing of the designated number of copies of the placed entire document is completed, the CPU 31 completes the mode selection copy process.

In a case where the number of copies is one (Yes in STEP S102), in STEP S111, the CPU 31 determines whether any sheet feeding unit has been designated by the user. In a case where a sheet feeding unit has been designated (Yes in STEP S111), since the CPU 31 is able to grasp the sheet size, the read range of the document is uniquely determined. That is, the CPU 31 controls the image reading unit 2 to read the image of a range corresponding to the designated sheet size.

In the case where a sheet feeding unit has been designated (Yes in STEP S111), next, in STEP S113, the CPU 31 determines whether data is being received through the interface 37, 38, or 39. Data reception through the interface 37, 38, or 39 needs some memory capacity. That is, there is a possibility that the capacity of the RAM 33 usable for a copy process would be restricted. If a copy process in the preceding print mode is performed in a state where the usable capacity of the RAM 33 has been restricted, there may be a risk that the memory capacity would be insufficient in the middle of the copy process. Therefore, a possibility of occurrence of copy errors may increase.

If data is not being received through the interface 37, 38, or 39 (No in STEP S113), it is possible to use the RAM 33 without any trouble, as compared to the case where data is being received. Therefore, the CPU 31 selects the preceding print mode in STEP S115, and starts a print operation in STEP S105. In a case where there is any sheet of the document to be continuously copied, the next sheet of the document is read, and is printed in the preceding print mode. When print of the entire document is completed, the CPU 31 completes the mode selection copy process.

In a case where any sheet feeding unit has not been designated (No in STEP S111), the read range of the document is not uniquely determined. For this reason, if copy in the preceding print mode is performed, and a print operation starts before reading of the document is completed, there is a risk that a copy error might occur in a case where the image of the document is larger than a fed sheet. Further, in the case where data is being received (Yes in STEP S113), there is a risk that the memory capacity usable for a copy process would be insufficient in the middle of the copy process. That is, in the case where any sheet feeding unit has not been designated or in the case where data is being received, as compared to the case where the sheet feeding unit has been designated and data is being received, a possibility that an error attributable to selection of the preceding print mode would occur is high.

Thus, in the case where any sheet feeding unit has not been designated (No in STEP S111), or in the case where a sheet feeding unit has been designated (Yes in STEP S111) and data is being received (Yes in STEP S113), in STEP S117, the CPU 31 determines whether selection of the memory print mode has been designated by the user.

In order for a user who desires certainty rather than speed, the MFP 100 is configured to be able to receive an instruction for selecting the memory print mode. For example, the user can operate the button group 41 while watching the display unit 42, thereby inputting an instruction for designating the memory print mode to put more emphasis on certainty than speed.

In a case where selection of the memory print mode has been designated for certainty by the user (Yes in STEP S117), the CPU 31 selects the memory print mode in STEP S103, and controls the image forming unit 1 to start a print operation in STEP S105. When the print is completed, the CPU 31 completes the mode selection copy process.

Unless the user indicates his/her intention to designate the memory print mode, the CPU 31 preferentially selects the preceding print mode as much as possible. Further, in a case where selection of the memory print mode has not been designated (No in STEP S117), in STEP S119, the CPU 31 determines whether the read mode is the discontinuous read mode.

The discontinuous read mode is a read mode which is not a read mode of continuously reading a document of a plurality of sheets. Examples of the discontinuous read mode include a read mode of the FB scheme, and a read mode of the ADF scheme in a case where a document of only one sheet is placed. In a case where the document read mode is the discontinuous read mode, when a copy process in the preceding print mode is performed, even if a copy error occurs, a loss of expendables and effort of performing the copy process over again correspond to only one sheet of the document, and the influence of the error is small. Therefore, in the case where the document read mode is the discontinuous read mode, the CPU 31 selects the preceding print mode as long as other conditions allow it.

Incidentally, as described above, in a case where the read mode in the ADF scheme starts, the CPU 31 is able to acquire information on whether the document placed on the document placing tray 21 is one sheet. After reading of a sheet of the document starts, the CPU 31 is able to obtain the information on whether the document is one sheet, on the basis of the results of the document detecting unit 27 and the one-sheet detecting unit 28 provided to the document placing tray 21, until print of the corresponding sheet starts.

Then, in a case of determining that the read mode is the discontinuous read mode (Yes in STEP S119), the CPU 31 selects the preceding print mode. However, a case where it is determined in STEP S119 that the read mode is the discontinuous read mode includes a case where designation of a sheet feeding unit has not been performed. In the case where designation of a sheet feeding unit has not been performed, the CPU 31 needs to perform designation of a sheet feeding unit and determination of a read range before starting an image forming operation. For this reason, in the case of determining that the read mode is the discontinuous read mode (Yes in STEP S119), in STEP S121, the CPU 31 performs a sheet-feeding-unit determining process.

The sheet-feeding-unit determining process is a process of determining a sheet tray 45 to feed sheets. The CPU 31 performs the sheet-feeding-unit determining process, thereby determining a sheet size for print. Further, the CPU 31 determines the read range of the document according to the determined sheet size for print. The sheet-feeding-unit determining process will be described below.

When the sheet-feeding-unit determining process of STEP S121 is completed, in STEP S115, the CPU 31 performs copy in the preceding print mode. Then, in STEP S105, the CPU 31 controls a sheet tray 45 designated by the sheet-feeding-unit determining process to feed a sheet, and controls the image forming unit 1 to start a print operation at an appropriate timing. When the print is completed, the CPU 31 completes the mode selection copy process.

In a case of determining that the read mode is not the discontinuous read mode (No in STEP S119), the CPU 31 selects the memory print mode in STEP S103, and starts a print operation in STEP S105. The fact that the read mode is not the discontinuous read mode means that the read mode is a mode of continuously reading a document of a plurality of sheets in reading in the ADF scheme. The CPU 31 is able to determine whether the placed document is a plurality of sheets, on the basis of the result of the one-sheet detecting unit 28 of the document placing tray 21.

In the case where the read mode is not the discontinuous read mode, if an error occurs, there is a possibility that a loss of the expendables would be great and the effort of performing the copy process over again would be increased. For this reason, in the case where the read mode is not the discontinuous read mode, it is preferable not to select the preceding print mode. Then, if the print is completed, the CPU 31 completes the mode selection copy process.

[Sheet-Feeding-Unit Determining Process]

Figure 6:
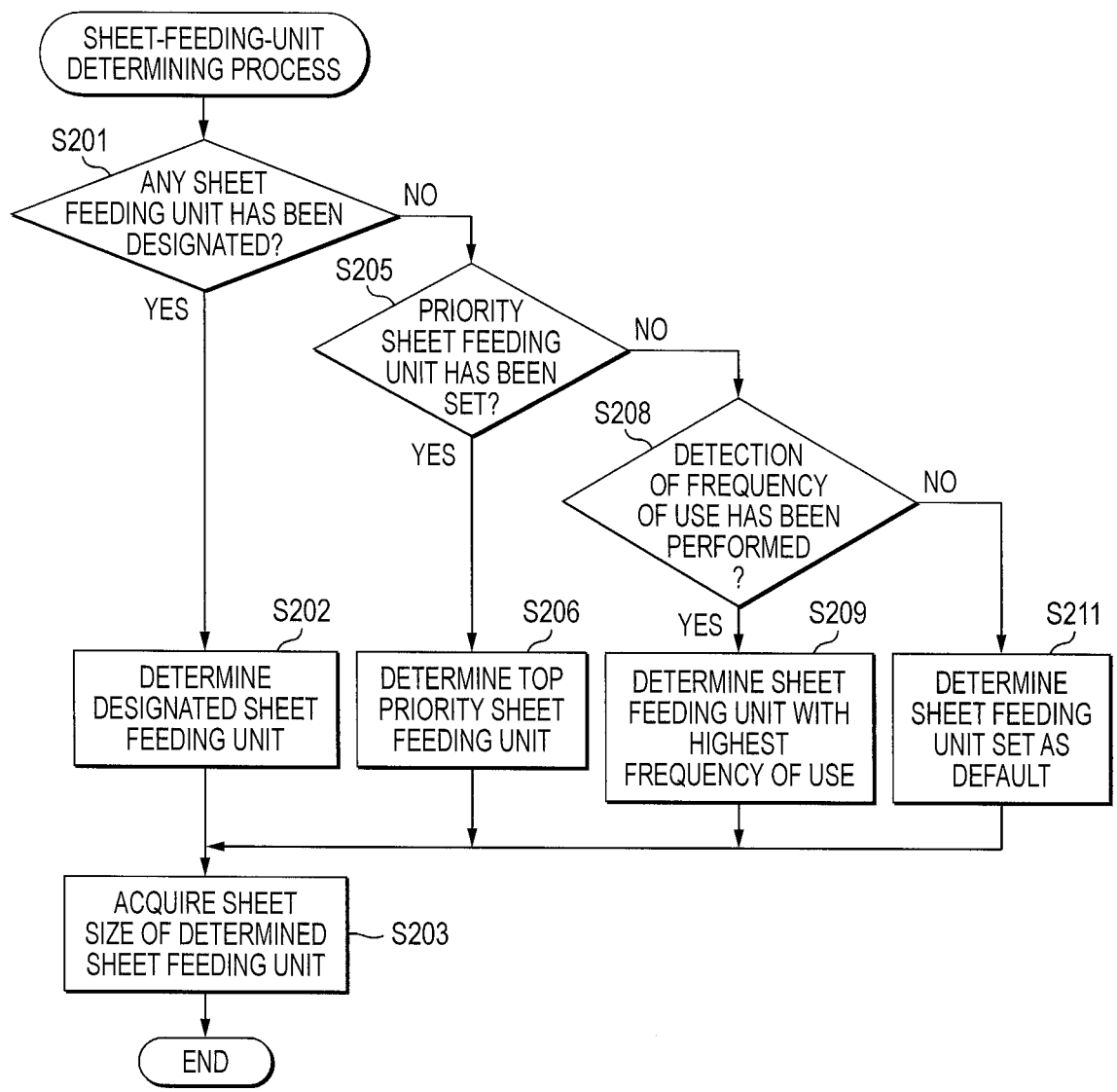
FIG. 6 is a flow chart illustrating a sheet-feeding-unit determining process.

Next, the sheet-feeding-unit determining process which is performed in STEP S121 of the mode selection copy process will be described with reference to the flow chart of FIG. 6. In the case of determining that the read mode is the discontinuous read mode (Yes in STEP S119), the sheet-feeding-unit determining process is performed by the CPU 31. Incidentally, in the following description, it is assumed that a sheet feeding unit is selected from the sheet trays 45. However, it is also possible to select a sheet feeding unit from the sheet trays 45 and the manual feed inlet 46.

When performance of the sheet-feeding-unit determining process starts, first, the CPU 31 determines whether any sheet feeding unit has been designated by the user. If a sheet feeding unit has been designated by the user (Yes in STEP S201), in STEP S202, the CPU 31 determines the designated sheet tray 45 as a sheet feeding unit. Then, in STEP S203, the CPU 31 acquires a sheet size set for the determined sheet feeding unit. Further, the CPU 31 determines the size of a read range of the document according to the sheet size acquired in STEP S203. Then, the CPU 31 completes the sheet-feeding-unit determining process, and proceeds to STEP S115 of FIG. 5.

On the other hand, in a case where designation of a sheet feeding unit has not been performed by the user (No in STEP S201), in STEP S205, the CPU 31 determines whether a priority sheet feeding unit has been set by the user. For example, in a case where there is no instruction for each job, if a sheet feeding unit to be preferentially used has been determined in advance by the user, the CPU 31 determines that a priority sheet feeding unit has been set (Yes in STEP S205). Then, in STEP S206, the CPU 31 determines a predetermined top priority sheet feeding unit as a sheet feeding unit. The top priority sheet feeding unit means a priority sheet feeding unit with the highest priority.

Meanwhile, in a case where setting of a priority sheet feeding unit has not been performed (No in STEP S205), in STEP S208, the CPU 31 determines whether the frequency of use of each sheet tray 45 has been recorded. For example, in a case where sheet trays 45 used every time of print have been counted, the CPU 31 determines that the frequency of use of each sheet tray 45 has been recorded (Yes in STEP S208). Then, in STEP S209, the CPU 31 determines a sheet tray 45 with the highest frequency of use, as a sheet feeding unit.

On the other hand, in a case where all of designation of a sheet feeding unit for each job, setting of a priority tray, and detection of the frequency of use of each sheet tray 45 have not been performed (No in STEP S208), in STEP S211, the CPU 31 determines a predetermined default sheet tray 45 as the sheet feeding unit. The default is set in the MFP 100 before factory shipment.

Alternatively, as the default, not a specific sheet tray 45 but a recommended sheet size may be set. In this case, the CPU 31 selects a sheet tray for which the recommended sheet size has been set as its sheet size, as the sheet feeding unit, from the sheet trays 45. As the recommended sheet size, for example, an A4 size or a letter size may be appropriate.

Further, if a sheet feeding unit is determined in STEP S206, S209, or S211, in STEP S203, the CPU 31 acquires the size of sheets placed on the determined sheet feeding unit. Further, the CPU 31 determines the read range of the document according to the determined sheet size. Then, the CPU 31 completes the sheet-feeding-unit determining process, and proceeds to STEP S115 of FIG. 5.

As described above in detail, according to the MFP 100 of the present exemplary embodiment, in the case where the specific condition including the condition that the read mode is performed in the discontinuous read mode is satisfied, the preceding print mode is positively performed. Therefore, there are many opportunities to select the preceding print mode. Specifically, since the specific condition includes the condition that the read mode is performed in the discontinuous read mode, it is difficult for a serious problem attributable to copy errors to occur. Therefore, it is possible to expect to secure an opportunity to perform the preceding print mode while suppressing the influence of defects attributable to copy errors.

[Other Examples of Mode Selection Copy Process]

The MFP 100 of the present invention performs the determination on whether data is being received (STEP S113 of FIG. 5), and the determination on whether selection of the memory print mode selection has been designated by the user (STEP S117), as the mode selection copy process. However, those steps may be omitted.

Figure 5:
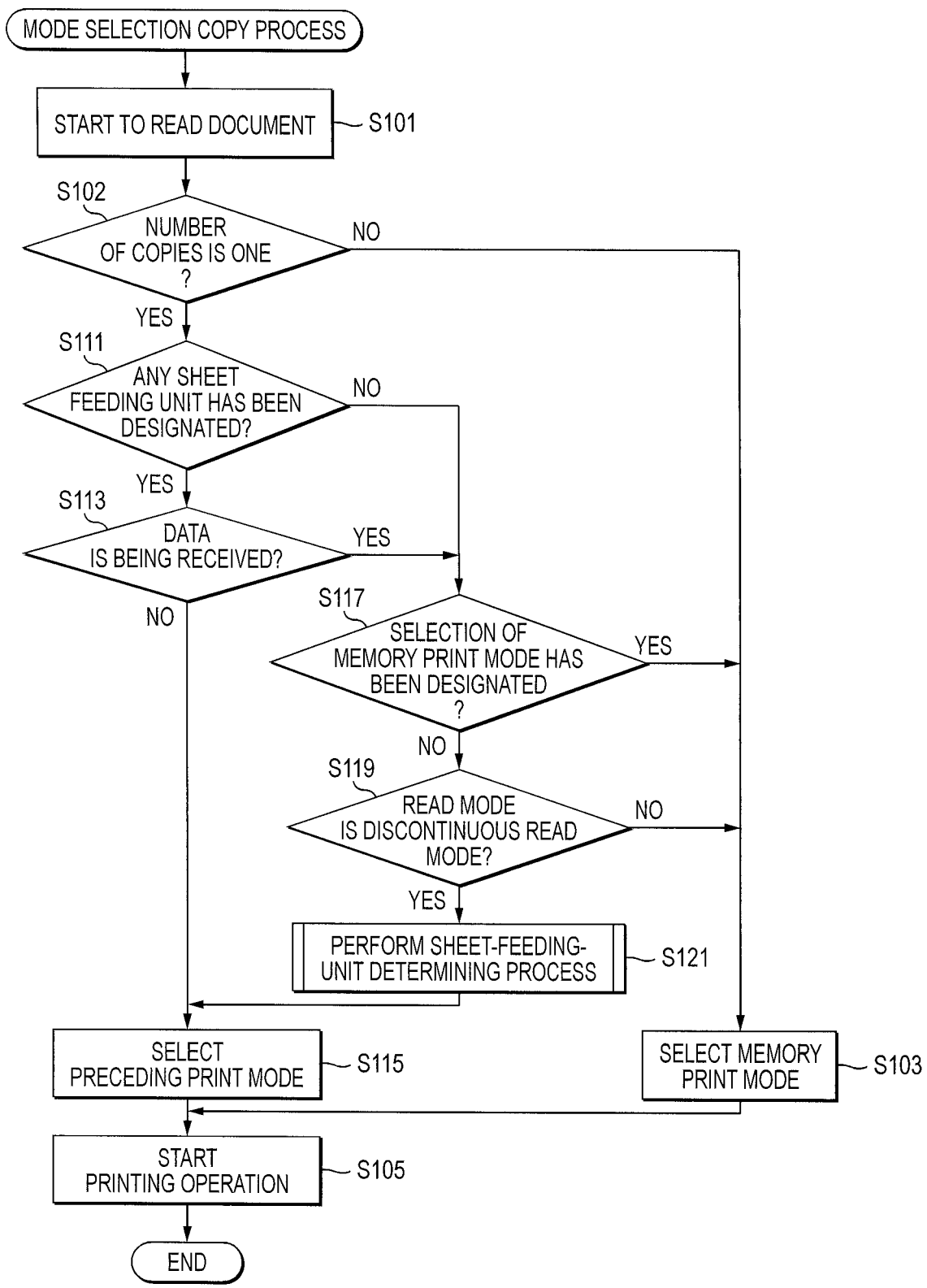
FIG. 5 is a flow chart illustrating a mode selection copy process.

For example, in a process omitting STEP S113, according to existence or non-existence of designation of a sheet feeding unit in STEP S111 of FIG. 5, the CPU 31 proceeds to STEP S115 or S117. That is, in the case where a sheet feeding unit has been designated (Yes in STEP S111), in STEP S115, the CPU 31 determines the preceding print mode. Meanwhile, in the case where any sheet feeding unit has not been designated (No in STEP S111), in STEP S117, the CPU 31 determines whether selection of the memory print mode has been designated by the user.

Or, for example, in a process omitting STEP S117, in a case of "No" in STEP S111 of FIG. 5 or "Yes" in STEP S113, in STEP S119, the CPU 31 determines whether the read mode is the discontinuous read mode. That is, in the case where any sheet feeding unit has not been designated (No in STEP S111) or if data is being received (Yes in STEP S113), the CPU 31 necessarily determines whether the read mode is the discontinuous read mode in STEP S119.

Or, it may be possible to omit both of STEPS S113 and S117. In this case, the specific condition includes only a condition that the number of copies should be one, and the condition that the read mode should be the discontinuous read mode.

Incidentally, the above-described exemplary embodiments are merely illustrative, and do not limit the present invention at all. Therefore, naturally, the present invention can be variously modified or changed without departing from the scope of the present invention. For example, the present invention is not limited to the MFP, but can be applied to any apparatuses having a copy function, such as copy machines and facsimiles.

For example, it is possible to apply the present invention to a MFP 100 without the document feeding unit 20. Further, in the preceding print mode, the read image data is used without compression; however, the read image data may be compressed with a low compression ratio within a range having no influence on a process speed. Furthermore, if the RAM 33 has a sufficiently large capacity, it is also possible to apply the preceding print mode even with respect to print of two or more copies.

In the above-described exemplary embodiment, in the process of STEP S111 of FIG. 5, for example, it is determined whether any sheet feeding unit has been designated; however, it is needed only to be able to grasp a sheet size. For this reason, in a case where sheets having the same are stored in all sheet feeding units, or there is only one sheet feeding unit storing sheets, like the case where a sheet feeding unit has been designated, it is possible to determine "Yes" in STEP S111.

For example, as the process of STEP S111 of FIG. 5, instead of the determination on whether any sheet feeding unit has been designated, determination on whether the read range of the document has been designated may be performed. For example, in a case where the read range has been designated by the user, the CPU 31 may select a sheet feeding unit such that it is possible to feed sheets according to the size of the read range.

The processes disclosed in the exemplary embodiments may be performed by a single CPU, a plurality of CPUs, hardware such as an ASIC, or a combination of them. Further, the processes disclosed in the exemplary embodiments may be implemented in various forms such as recording media having programs for executing those processes, or methods of performing those processes.

What is claimed is:

1. A copy machine comprising:
    a reading unit configured to read a document;
    a printing unit configured to print an image of the document read by the reading unit onto recording paper;
    a processor; and
    memory storing computer readable instruction that, when executed by the processor, cause the copy machine to:
    determine whether a read range of the document has been uniquely determined before the reading by the reading unit starts;
    in a case where the read range of the document has not been uniquely determined before the reading by the reading unit starts, determine whether a specific condition, which includes at least a condition that a read mode of the reading unit is performed in a discontinuous read mode, is satisfied;
    in a case where the specific condition is satisfied, control the printing unit to perform printing in a preceding print mode, comprising starting printing of the image of the document before the reading of the document by the reading unit is completed; and in a case where the specific condition is not satisfied, control the printing unit to perform printing in a memory print mode, comprising starting printing of the image of the document after the reading of the document by the reading unit is completed.

2. The copy machine according to claim 1,
wherein in a case where a read range of the document has been uniquely determined before the reading by the reading unit starts, even if the specific condition is not satisfied, the processor is configured to control the printing unit to perform printing in the preceding print mode.

3. The copy machine according to claim 1,
wherein in a case where the read range of the document has been uniquely determined before the reading by the reading unit starts, the processor is configured to control the printing unit to perform printing in the preceding print mode without determining whether the reading mode of the reading unit is performed in the discontinuous read mode.

4. The copy machine according to claim 1,
wherein in a case where the memory print mode has been designated by setting, even if the specific condition is satisfied, the processor is configured to control the printing unit to perform printing in the memory print mode.

5. The copy machine according to claim 1,
wherein in a case where any sheet feeding unit has not been designated when the processor controls the printing unit to perform printing in the preceding print mode, the processor is configured to select and use a sheet feeding unit with a high frequency of use.

6. The copy machine according to claim 1,
wherein the specific condition further includes a condition that a designated number of copies to be printed is one.

7. The copy machine according to claim 6,
wherein in a case where the designated number of copies to be printed is one and a read range of the document has been uniquely determined before the reading by the reading unit starts, the processor is configured to control the printing unit to perform printing in the preceding print mode without determining whether the reading mode of the reading unit is performed in the discontinuous read mode.

8. The copy machine according to claim 1,
wherein the processor is further configured to determine whether a number of sheets of the document to be read is one, and
wherein in a case where the processor determines that the number of sheets of the document is one, the processor is configured to set the read mode of the reading unit to the discontinuous read mode.

9. The copy machine according to claim 8,
wherein in a case where the processor determines that the number of sheets of the document is not one, the processor is configured to control the printing unit to perform printing in the memory read mode.

10. The copy machine according to claim 1,
wherein the reading unit comprises a reading device that is movable and is configured to read the document,
wherein the reading unit has:
a document-movement-based reading function of reading the document while moving the document; and
a device-movement-based reading function of reading the document while moving the reading device, and
wherein in a case where the reading unit uses the device-movement-based reading function to read the document, the processor is configured to set the read mode of the reading unit to the discontinuous read mode.

11. The copy machine according to claim 10,
wherein in a case where the reading unit uses the document-movement-based reading function to read the document, the processor is configured to determine whether the number of sheets of the document to be read is one,
wherein in a case where the processor determines that the number of sheets of the document is one, the processor is configured to set the read mode of the reading unit to the discontinuous read mode and control the printing unit to perform printing in the preceding print mode, and
wherein in a case where the processor determines that the number of sheets of the document is not one, the processor is configured to control the printing unit to perform printing in the memory print mode.

12. The copy machine according to claim 1, further comprising:
a document placing part configured to place the document thereon; and
a one-sheet detector configured to detect that the placed document is one sheet,
wherein the processor is configured to:
in a case where the one-sheet detector detects that the placed document is one sheet, determine that the specific condition is satisfied and control the printing unit to perform printing in the preceding print mode; and
in a case where the one-sheet detector detects that the placed document is plurality sheets, determine that the specific condition is not satisfied and control the printing unit to perform printing in the memory print mode.

13. The copy machine according to claim 1, wherein the read range is determined by grasping a size of the recording paper, to which the image of the read document is printed.

14. The copy machine according to claim 1, wherein the determining of the read range comprises determining whether any sheet feeding unit for feeding the recording paper, to which the image of the read document is printed, has been designated before the reading by the reading unit starts.

15. A copy machine comprising:
a reading unit configured to read a document;
a printing unit configured to print an image of the document read by the reading unit onto recording paper;
a processor; and
memory storing computer readable instruction that, when executed by the processor, cause the copy machine to:
in a case where a number of copies is one and a read range of the reading unit has been uniquely determined before the reading by the reading unit starts, control the printing unit to perform printing in a preceding print mode, comprising starting printing of the image of the document before the reading of the document by the reading unit is completed;
in a case where the number of copies is one, and the read range of the reading unit has not been uniquely determined before the reading by the reading unit starts and the read mode of the reading unit is a discontinuous read mode, control the printing unit to perform printing in the preceding print mode;
in a case where the number of copies is two or more, control the printing unit to perform printing in a memory print mode, comprising starting printing of the image of the document after the reading of the document by the reading unit is completed; and
in a case where the number of copies is one, the read range of the reading unit has not been uniquely determined before the reading by the reading unit starts and the read mode of the reading unit is not the discontinuous read mode, control the printing unit to perform printing in the memory print mode.

* * * * *